(12) United States Patent
Haziza

(10) Patent No.: US 10,199,710 B2
(45) Date of Patent: Feb. 5, 2019

(54) VARIABLE DIELECTRIC CONSTANT-BASED DEVICES

(71) Applicant: Wafer LLC, Hanover, NH (US)

(72) Inventor: Dedi David Haziza, Kiryat Motzkin (IL)

(73) Assignee: WAFER LLC, Hanover, NH (US)

( * ) Notice: Subject to any disclaimer, the term of this patent is extended or adjusted under 35 U.S.C. 154(b) by 20 days.

(21) Appl. No.: 15/421,388

(22) Filed: Jan. 31, 2017

(65) Prior Publication Data

US 2018/0062238 A1 Mar. 1, 2018

Related U.S. Application Data

(60) Provisional application No. 62/382,506, filed on Sep. 1, 2016.

(51) Int. Cl.

| | |
|---|---|
| *H01P 1/18* | (2006.01) |
| *H01P 5/12* | (2006.01) |
| *H01P 1/22* | (2006.01) |
| *H01P 1/20* | (2006.01) |
| *H01P 5/04* | (2006.01) |
| *H01P 1/26* | (2006.01) |
| *H01P 5/18* | (2006.01) |
| *H01P 5/19* | (2006.01) |
| *H01P 5/22* | (2006.01) |
| *G02F 1/133* | (2006.01) |
| *H01P 1/203* | (2006.01) |

(52) U.S. Cl.
CPC ............ *H01P 5/19* (2013.01); *G02F 1/13306* (2013.01); *H01P 1/184* (2013.01); *H01P 1/2002* (2013.01); *H01P 1/20363* (2013.01); *H01P 1/227* (2013.01); *H01P 1/268* (2013.01); *H01P 5/04* (2013.01); *H01P 5/12* (2013.01); *H01P 5/185* (2013.01); *H01P 5/187* (2013.01); *H01P 5/227* (2013.01)

(58) Field of Classification Search
CPC ....... H01P 5/19; H01P 1/2002; G02F 1/13306
USPC ......................................................... 333/135
See application file for complete search history.

(56) References Cited

U.S. PATENT DOCUMENTS 7,466,269 B2 * 12/2008 Haziza ..................... H01Q 3/36
343/700 MS

* cited by examiner

*Primary Examiner* — Stephen E. Jones
*Assistant Examiner* — Kimberly E Glenn
(74) *Attorney, Agent, or Firm* — Womble Bond Dickinson (US) LLP; Joseph Bach, Esq.

(57) ABSTRACT

Electrical devices having variable electrical properties. The variable electrical characteristics or operation of the devices are based on the potential applied to a variable-dielectric constant sector associated with the device. The electronic devices or component may include bends, power splitters, filters, ports, phase shifters, frequency shifters, attenuators, couplers, capacitors, inductors, diplexers, hybrids of beam forming networks.

17 Claims, 6 Drawing Sheets

*Power splitter*

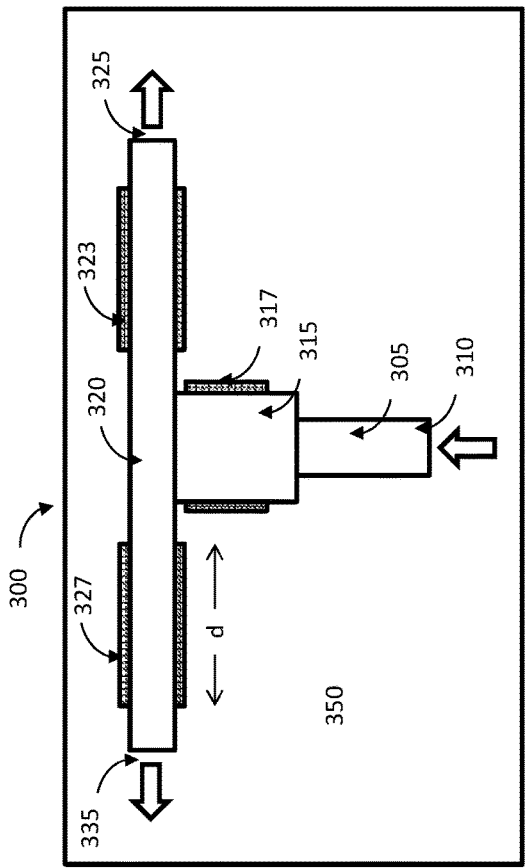
Figure 3
*Power splitter*
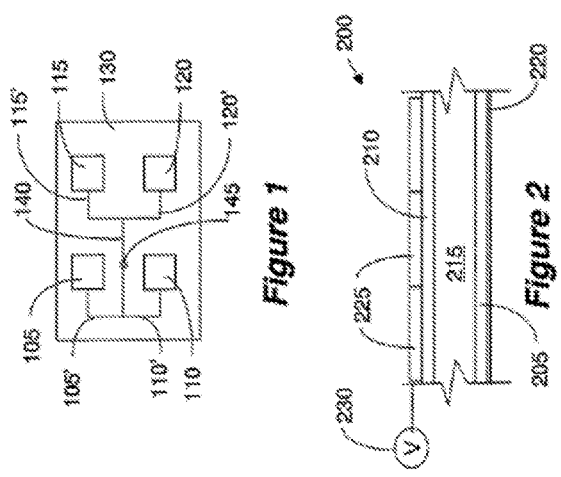
*Figure 1*
*Figure 2*
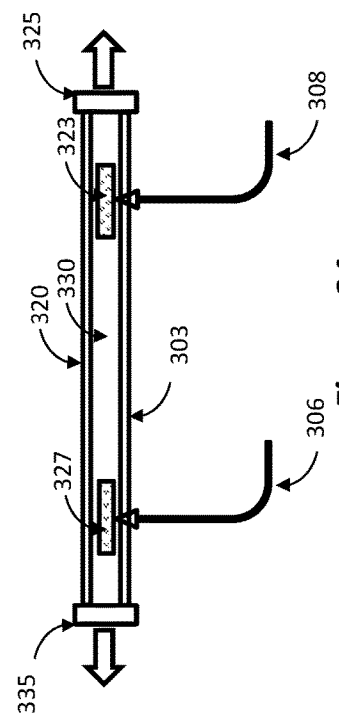
*Figure 3A*

VARIABLE DIELECTRIC CONSTANT-BASED DEVICES

RELATED APPLICATION

This Application claims priority benefit from U.S. Provisional Application No. 62/382,506, filed on Sep. 1, 2016, the disclosure of which is incorporated herein by reference in its entirety.

BACKGROUND

1. Field of the Invention

The general field of the invention relates to unique electromagnetic components having electrical characteristics that are variable. The components can be used for radiating and non-radiating electromagnetic devices. Embodiments of the invention also relate to electrical devices having elements structured on LCD, such that the operation of the LCD changes the characteristics of the electrical devices.

2. Related Arts

Various electrical devices/components are known in the art for receiving, transmitting, and manipulating electrical signals and electro-magnetic radiation. The feed or transmission lines or network conveys the signal between the radiating antenna and the transceiver. However, the feed network may comprise different type of transmission lines, bends, power splitters, filters, ports, phase shifters, frequency shifters, attenuators, couplers, capacitors, inductors, diplexers, hybrids of beam forming networks, and may also include radiating elements. Similar arrangement may be in transmission lines which do not transmit wirelessly, e.g., coaxial transmission of television programming. These elements may be static or variable. For example, a capacitor may have a given, i.e., static capacity, or it may be variable, e.g., by mechanically changing the distance between the capacitor plates. Other devices, such as transmission lines, for example, are static in that their electrical characteristics (such as resistance or impedance) do not change.

While the devices disclosed herein are generic and may be applicable to multitude of applications, one particular application that can immensely benefit from the subject devices are the transmission of signals in mobile devices which operate in several frequencies. In such devices, an elaborate network of switches and filters are used to couple one of several transceivers to the antenna. Such network increases the cost of the devices and leads to losses which attenuate the signal, thus requiring increasing the power of the transmitter to thereby consume more battery power.

There are several types of microstrip antennas (also known as a printed antennas), the most common of which is the microstrip patch antenna or simply patch antenna. A patch antenna is a narrowband, wide-beam antenna fabricated by etching the antenna element pattern in metal trace bonded to an insulating substrate. Some patch antennas eschew a substrate and suspend a metal patch in air above a ground plane using dielectric spacers; the resulting structure is less robust but provides better bandwidth. Because such antennas have a very low profile, are mechanically rugged and can be conformable, they are often mounted on the exterior of aircraft and spacecraft, or are incorporated into mobile radio communications devices.

An advantage inherent to patch antennas is the ability to have polarization diversity. Patch antennas can easily be designed to have Vertical, Horizontal, Right Hand Circular (RHCP) or Left Hand Circular (LHCP) Polarizations, using multiple feed points, or a single feedpoint with asymmetric patch structures. This unique property allows patch antennas to be used in many types of communications links that may have varied requirements.

FIG. 1 illustrates an example of a microstrip antenna of the prior art. As shown in FIG. 1, four conductive patches 105-120 are provided over insulating substrate 130. A base "common" ground conductor is provided below the dielectric 130, but is not shown in FIG. 1. Conductive lines 105'-120' provide electrical connection to main line 140, which is connected to a central feed line 145.

A liquid crystal display (commonly abbreviated LCD) is a thin, flat display device made up of any number of color or monochrome pixels arrayed in front of a light source or reflector. Each pixel of an LCD consists of a layer of perpendicular molecules aligned between two transparent electrodes, and two polarizing filters, the axes of polarity of which are perpendicular to each other. The liquid crystal material is treated so as to align the liquid crystal molecules in a particular direction. This treatment typically consists of a thin polymer layer that is unidirectionally rubbed using a cloth (the direction of the liquid crystal alignment is defined by the direction of rubbing).

Before applying an electric field, the orientation of the liquid crystal molecules is determined by the alignment at the surfaces. In a twisted nematic device (the most common liquid crystal device), the surface alignment directions at the two electrodes are perpendicular, and so the molecules arrange themselves in a helical structure, or twist. Because the liquid crystal material is birefringent, light passing through one polarizing filter is rotated by the liquid crystal helix as it passes through the liquid crystal layer, allowing it to pass through the second polarized filter. Half of the light is absorbed by the first polarizing filter, but otherwise the entire assembly is transparent.

When a voltage is applied across the electrodes, a torque acts to align the liquid crystal molecules parallel to the electric field, distorting the helical structure (this is resisted by elastic forces since the molecules are constrained at the surfaces). This reduces the rotation of the polarization of the incident light, and the device appears darker. If the applied voltage is large enough, the liquid crystal molecules are completely untwisted and the polarization of the incident light is not rotated at all as it passes through the liquid crystal layer. This light will then be polarized perpendicular to the second filter, and thus be completely blocked and the pixel will appear black. By controlling the voltage applied across the liquid crystal layer in each pixel, light can be allowed to pass through in varying amounts, correspondingly illuminating the pixel.

FIG. 2 illustrates a cross-section of an LCD of the prior art. As shown in FIG. 2, the LCD 200 comprises a back panel 205 which may be glass, a front panel 210 which is also generally made of glass, a liquid crystal 215 positioned between the two panels, a back electrode 220 (corresponding to the common ground conductor of FIG. 1), which may be indium/titanium/oxide (ITO), aluminum, etc, and front electrodes 225, which are coupled to potential 230 and are generally made of ITO. The potential 230 may be applied individually to each electrode 225. As potential is applied to an electrode 225, the liquid crystal below it changes its orientation and, thereby changes the local dielectric constant between the powered electrode and the section of the rear electrode corresponding to the area of the front electrode.

SUMMARY

The following summary of the invention is included in order to provide a basic understanding of some aspects and features of the invention. This summary is not an extensive overview of the invention, and as such it is not intended to particularly identify key or critical elements of the invention, or to delineate the scope of the invention. Its sole purpose is to present some concepts of the invention in a simplified form as a prelude to the more detailed description that is presented below.

According to aspects of the invention, electronic devices or components are provided, which have variable electrical characteristics or operation based on potential applied to a variable-dielectric constant sector associated with the device.

According to aspects of the invention, the electronic devices or component may include bends, power splitters, filters, ports, phase shifters, frequency shifters, attenuators, couplers, capacitors, inductors, diplexers, hybrids of beam forming networks, and may also include radiating elements.

According to aspects of the invention, the electronic or devices have variable capacitance, admittance, and/or impedance.

According to aspects of the invention, the variable electrical characteristics lead to variable operation of the device/component, such as variable phase shifting, variable power distribution, variable filter operation, variable frequency, variable match, variable coupling power, variable amplitude, variable attenuation, etc.

Aspects of the invention provide electrical components that are software defined, in that their electrical characteristics are variable and modifiable using software programs.

BRIEF DESCRIPTION OF THE DRAWINGS

The accompanying drawings, which are incorporated in and constitute a part of this specification, exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

FIG. 1 illustrates an example of a microstrip antenna of the prior art.

FIG. 2 illustrates a cross-section of an LCD of the prior art.

FIG. 3 illustrates a power splitter according to an embodiment of the invention, while FIG. 3A illustrates a cross-section of part of FIG. 3.

FIG. 11A illustrates a prior art multiple fixed-filter arrangement, while

DETAILED DESCRIPTION

Figure 4:
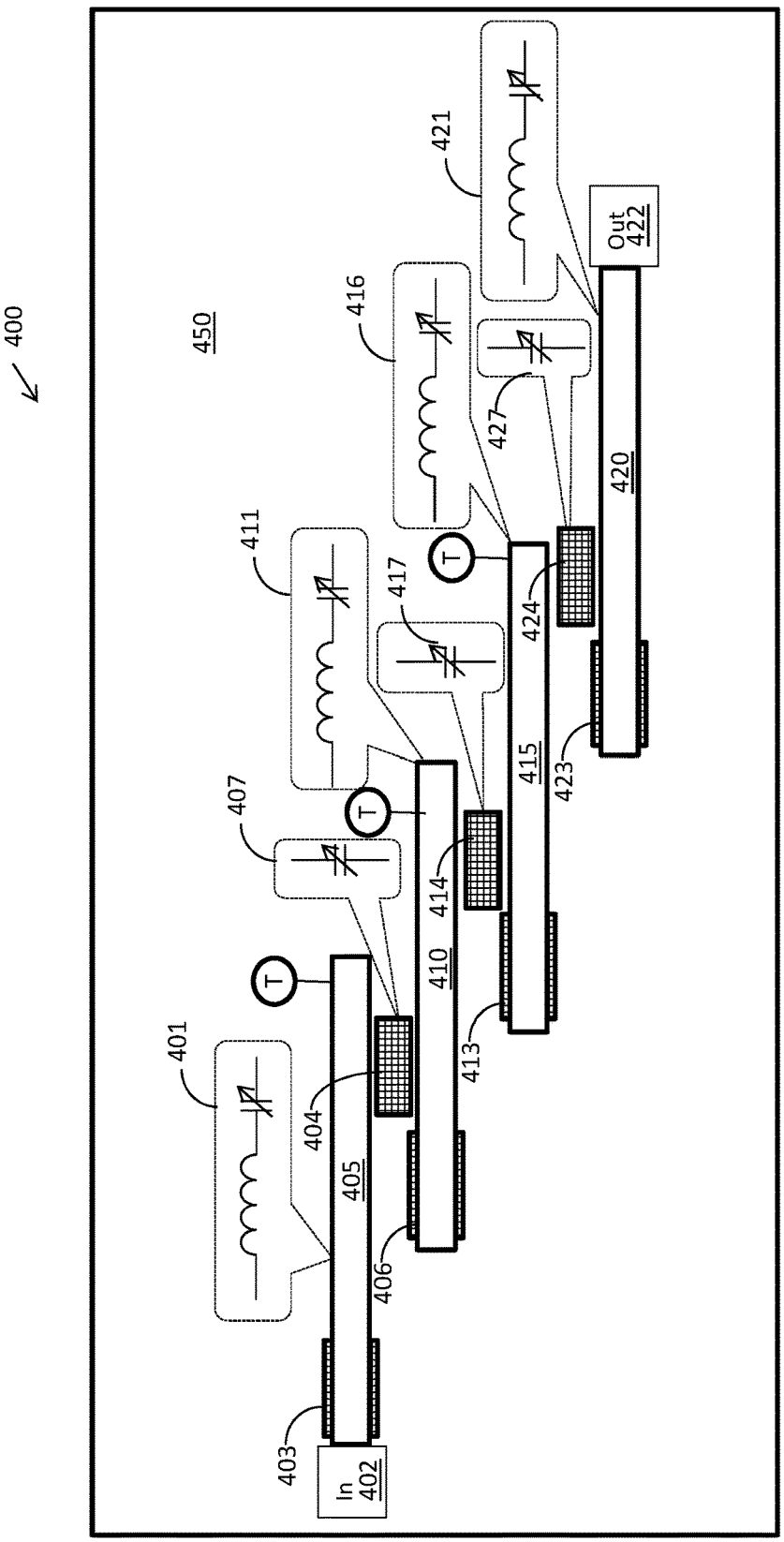
FIG. 4 illustrates a construction of a variable filter according to one embodiment.

Various embodiments of the invention are generally directed to a structure of electronic devices or components provided over a variable dielectric structure, providing variable control over the operating characteristics of the components. In the context of the description of the various embodiments, an LCD forms the variable dielectric structure so as to simplify the explanation; however, other variable dielectric elements may be used. For example, while an LCD may be used for the inventive electronic devices or components, the LCD need not include an illumination source unless it is also used to project an image. The various embodiments described herein may be used, for example, in connection with stationary and/or mobile platforms. Of course, the various electronic devices or components described herein may have other applications not specifically mentioned herein. Various applications where the inventive electronic devices or components may be particularly beneficial include smartphones, pads, laptops, etc. The various techniques may also be used for two-way communication and/or other receive-only applications.

The description of aspects of the invention will proceed with reference to different embodiments. Each description of a certain embodiment may highlight specific features. However, it should be understood that the described features may be incorporated in other embodiments as well and that different combination of these features may be assembled to form further embodiments.

FIG. 3 depicts an example of a power splitter 300 according to an embodiment of the invention. The power splitter 300 consists of a conductive input line 305 having input port 310, an optional expanded coupler 315, a splitter conductive line 320 having a first output port 325 and a second output port 335, all provided on an insulating substrate 350. Conductive input line 305, expanded coupler 315, and splitter conductive line 320 may all be strips of conductive material, e.g., copper or aluminum. In one implementation the substrate 350 is an LCD, while in other embodiments it is an insulating substrate having variable dielectric constant regions 317, 323 and 327 having addressable electrodes.

Using this configuration, the power input at the input port 310 is split into spreader line 320 and some power is output at the first output port 325 and the rest of the power is output at the second output port 335. In its natural un-energized condition, the split of the power is 50-50 (assuming a symmetrical physical structure), meaning half of the power is output at the first output port 325 and half of the power is output at the second output port 335, and the power output from the first and second output ports is in phase. However, when electrical potential is applied to the variable dielectric elements 317, 323, and/or 327, the power output and the power split can be varied. That is, by separately changing the dielectric constant of the material 317, 323, and/or 327, the impedance of the corresponding element can be changed.

More specifically, the phase, $\Phi$, can be expressed as:

$$\Phi = 2\pi d/\lambda_g$$

wherein $\lambda_g$ is the wavelength in the matter, i.e., conductive line, and $d$ is the length of the propagation line. On the other hand, $\lambda_g$ can be expressed as:

$$\lambda_g = \lambda_0/\lambda \varepsilon_{eff}$$

wherein $\lambda_0$ is the wavelength in air, $\varepsilon_{eff}$ the effective dielectric constant as a function of $\varepsilon_r$, line width, and other physical parameters of the microstrip line, and $\varepsilon_r$ is the dielectric constant of the propagation material. Then the phase can be expressed as:

$$\Phi = 2\pi d\sqrt{\varepsilon_{\it eff}}/\lambda_0$$

Therefore, by separately controlling the dielectric constant of a section of the variable dielectric material 317, 323, and/or 327 under each of the corresponding conductive line 315 and 320, the signal propagation in the line can be changed. Also, the phase can also be controlled by the length, d, of the section of the variable dielectric material that is controlled. That is, each of variable dielectric material 317, 323, and/or 327 may have a single addressable electrode such that the entire area of the variable dielectric material 317, 323, and/or 327 experiences the same applied voltage potential. Conversely, each of variable dielectric material 317, 323, and/or 327 may have a plurality of electrodes, arranged as pixels, each addressed separately so that only a section of the variable dielectric material experiences the applied voltage potential depending on which pixels are being addressed. In this manner, the device is software controlled, since software can be used to address different pixels and thereby modify the behavior of the electrical component.

For example, element 315 can serve as an attenuator. When no potential is applied to variable dielectric section 317, all of the supplied power propagates into conductor 320. On the other hand, when potential is applied to variable dielectric 317, the effective inductance of element 315 changes, so that attenuator 315 can reflect back some of the power, such that not all of the power is delivered to conductor 320, i.e., total output power is attenuated. Similarly, when potential is applied to variable dielectric section 323, it can reflect some of the power, such that less power is output through the first output port 325, meaning the split of power between the first and second output ports can be changed so that one output port receive more power than the other output port. In each of these cases, the amount of power reflected depends on the voltage applied to the electrodes of the variable dielectric and to the effective size of the variable dielectric. The effective size of the variable dielectric can be changed by addressing more or less of the pixels controlling the variable dielectric.

FIG. 3A illustrate a cross-section of the spreader line 320 of the embodiment of FIG. 3. In this embodiment, the dielectric constant is controlled using an LCD or any other material having variable dielectric constant that can be controlled using a signal line. In FIG. 3A, spreader line 320 is provided over insulating layer 330, which may be a glass panel, resin, air, etc. Variable dielectric elements 323 and 327 are provided in insulating layer 330 and each is provided over a respective section of the spreader line 320. The liquid crystal may be provided in one or more zones over each section of the spreader line 320. Each of the variable dielectric elements 323 and 327 is coupled to a respective activation signal line 306 and 308. When the potential on any of the signal lines 306 and 308 changes, the dielectric constant of the corresponding variable dielectric element 323 and 327 changes, thereby inducing a phase change in a corresponding section of the spreader line 320. The phase change can be controlled by choosing the amount of voltage applied to the transparent electrode signal lines 306 and 308, i.e., controlling $\varepsilon_r$, and also by controlling the number of dielectric elements the voltage is applied to, i.e., controlling the effective length of d.

It should be noted that the invention is not limited to the use of an LCD. That is, any material that exhibits a controllable variable dielectric constant can be used. For example, any ferroelectric material may be used instead of the liquid crystal. The embodiment shown here uses LCD, as the LCD technology is mature and readily available, which makes the invention very attractive and easy to implement.

FIG. 4 illustrates a construction of a variable filter according to one embodiment. This particular example illustrates a four-element filter, also referred to as a four-level filter. Of course, the number of elements or levels can be changed to fit any desired implementation. In FIG. 4 four conductive lines 405, 410, 415 and 420 are formed over a dielectric plate 450. An input 402 is connected to one side of conductive line 405 and an output 422 is connected to one side of conductive line 420. The input 402 and output 422 may be any standard connectors, such as, e.g., coaxial connectors, SMA (SubMiniature version A) connectors, etc. Also, taps T can be provided at the end of each lines 405, 410, and 415, and each tap may have the same connector as input and output 402 and 422. In such a configuration, in essence the filter has one input and four outputs, each output can be tuned to a different frequency and/or phase.

Generally, the inductance of each of the conductive lines 405, 410, 415 and 420 can be modeled as a series connection of a capacitor and inductor, as shown in callouts 401, 411, 416 and 421, respectively. An area or zone having a controllable variable dielectric constant (VDC) is provided under each of the conductive lines: VDC 403 is provided under line 405, VDC 406 is provided under conductive line 410, VDC 413 is provided under conductive line 415, and VDC 423 is provided under conductive line 420. Each of the VDC's may have a single electrode or a plurality of electrodes addressed collectively or individually to thereby apply a voltage potential to change the effective dielectric constant of the VDC. By changing the effective dielectric constant of a VDC provided under one of the conductive lines, the effective inductance of the line is changed. A change of the inductance of a line causes a change in the bandwidth of the signal traveling on the line. Since in this embodiment each conductive lines has a VDC zone under it, the bandwidth or each line can be changed, thereby making this filter a variable bandwidth filter. Also, if the VDC under all of the lines is biased, the center of frequency of the filter is changed. Since the voltage may be applied using software to address various electrodes of the VDC's, the filter is software controlled. That is, the bandwidth and center of frequency can be controlled using software to apply various potentials to the VDCs.

In the filter of FIG. 4 the signal travels from one line to the next via capacitive coupling between the lines. For example, a section of line 405 is placed in parallel to a section of line 410, thus forming a capacitor there-between. As the signal travels on line 405, it capacitively couples to line 410 and start propagating on line 410. The same goes for the other lines. The efficiency of the coupling depends on the amount of line sections that are overlapped, and the effective separation between these overlapping lines. The effective separation relates to the distance between the lines and the dielectric constant between the lines. In this embodiment, the dielectric constant between the lines is controlled by a zone of VDC, such that VDC 404 controls coupling between lines 405 and 410, VDC 414 controls coupling between lines 410 and 415, and VDC 424 controls coupling between lines 415 and 420, as exemplified by callouts 407, 417 and 427, respectively. By changing the potential applied to any of VDC 404, 414 and 424, the bandpass and the rejection slope of the filter can be varied and controlled. Thus, the filtering characteristics of the filter 400 can be made to be software controlled, i.e., by providing software that controls the potential applied to the various VDC's the operation of the filter 400 can be controlled.

Another operational characteristic of the filter 400 is its center frequency. In static filters the center frequency is a constant. However, in the arrangement of FIG. 4 the center frequency can be changed by concurrently applying voltage potential to all of the VDC's under the lines and between the lines. Thus, by appropriately controlling the voltage potential on the VDC's of filter 400, one can control its center frequency, its bandwidth, it bandpass, and its rejection slope.

Figure 5:
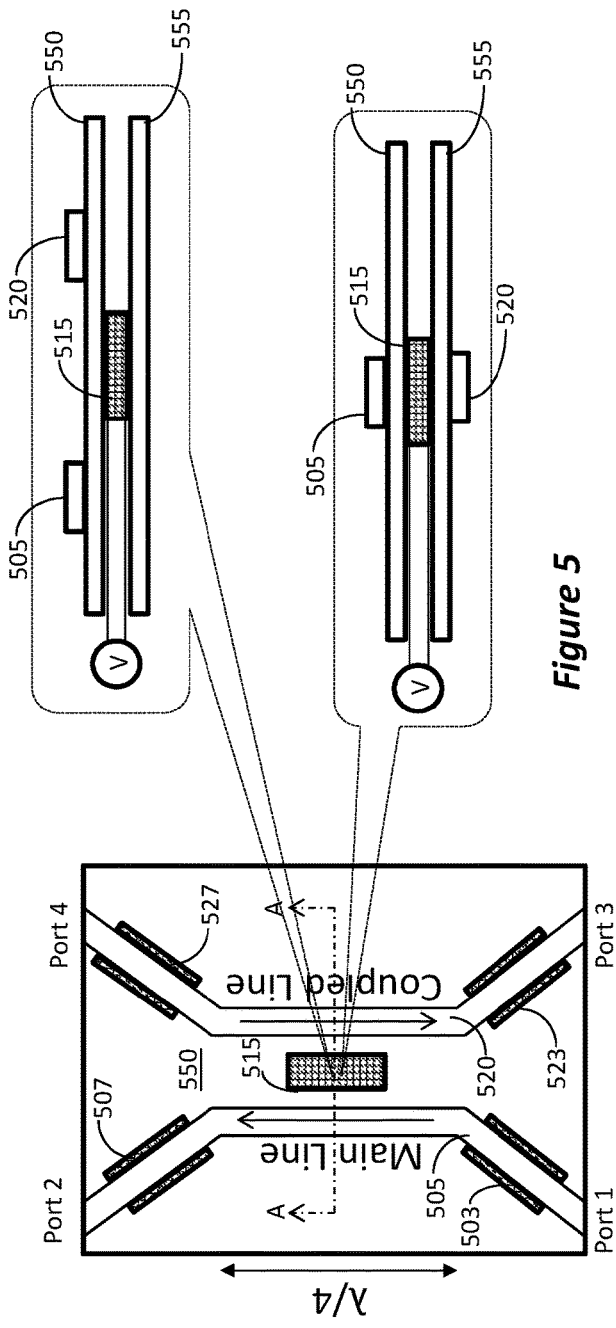
FIG. 5 illustrates a hybrid splitter according to an embodiment of the invention.

Power dividers (also called power splitters and, when used in reverse, power combiners) and directional couplers are passive devices used mostly in the field of radio technology. They couple a defined amount of the electromagnetic power in a transmission line to a port enabling the signal to be used in another circuit. A directional coupler designed to split power equally between two ports is called a hybrid coupler. The most common form of directional coupler is a pair of coupled transmission lines. They can be realized in a number of technologies including coaxial and the planar technologies (stripline and microstrip). An implementation in stripline is shown in FIG. 5 of a quarter-wavelength (λ/4) directional coupler. The power on the coupled line flows in the opposite direction to the power on the main line, so it is sometimes called a backward coupler. The main line is the section between ports 1 and 2 and the coupled line is the section between ports 3 and 4.

In the embodiment of FIG. 5, a main line 505 and a coupled line 520 are formed on dielectric plate 550. The main line 505 and coupled line 520 may be, e.g., microstrips on a dielectric plate, printed conductors on a Rogers (FR-4 printed circuit board), etc. In the embodiment of FIG. 5 port 1 is the input of the main line and port 2 is the output of the main line, while port 3 and port 4 are the input and output of the coupled line, respectively. Normally the output at port 2 would be in phase with the input at port 1, while the output at port 4 would be 90° phase shifted from the input at port 1.

In order to make the coupler of FIG. 5 variable, a VDC zone 515 is provided under dielectric plate 550 and is positioned in between the main line 505 and coupled line 520. By applying voltage potential onto the electrodes of VDC zone 515, the phase shift on the coupled line can be controlled. Moreover, optionally additional VDC zones 503, 507, 523 and 527 may be provided under the main and coupled lines to further control the phase shift on each port. For example, by changing the voltage potential on VDC zone 507 the inductance of output port 2 changes, such that the ratio of output from the main line and coupled line can be changed.

As illustrated by the top callout of FIG. 5, the main and coupled lines may be positioned on top of the dielectric plate 550. Conversely, the main and coupled lines may be formed one over each other, with the dielectric plate 550, VDC zone 515 and bottom dielectric plate 555 in between.

Figure 6:
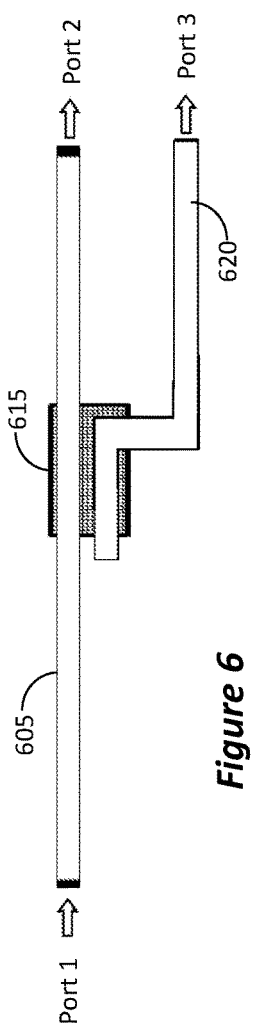
FIG. 6 illustrates a three-port variable coupler according to an embodiment of the invention.

FIG. 6 illustrates an embodiment for variable three port coupler. As before, all metal lines are formed over a dielectric plate and a VDC's are provided under the dielectric plate. However, for clarity and brevity, the description of the various embodiments continues without showing or referring to the dielectric plate. Main line 605 has input port 1 and output port 2, having no phase change. Coupled line 620 has output port 3, having variable phase with respect to the signal propagating on main line 605. The phase of the signal on the coupled line 620 is controlled by the voltage potential applied to the VDC zone 615.

Figure 7:
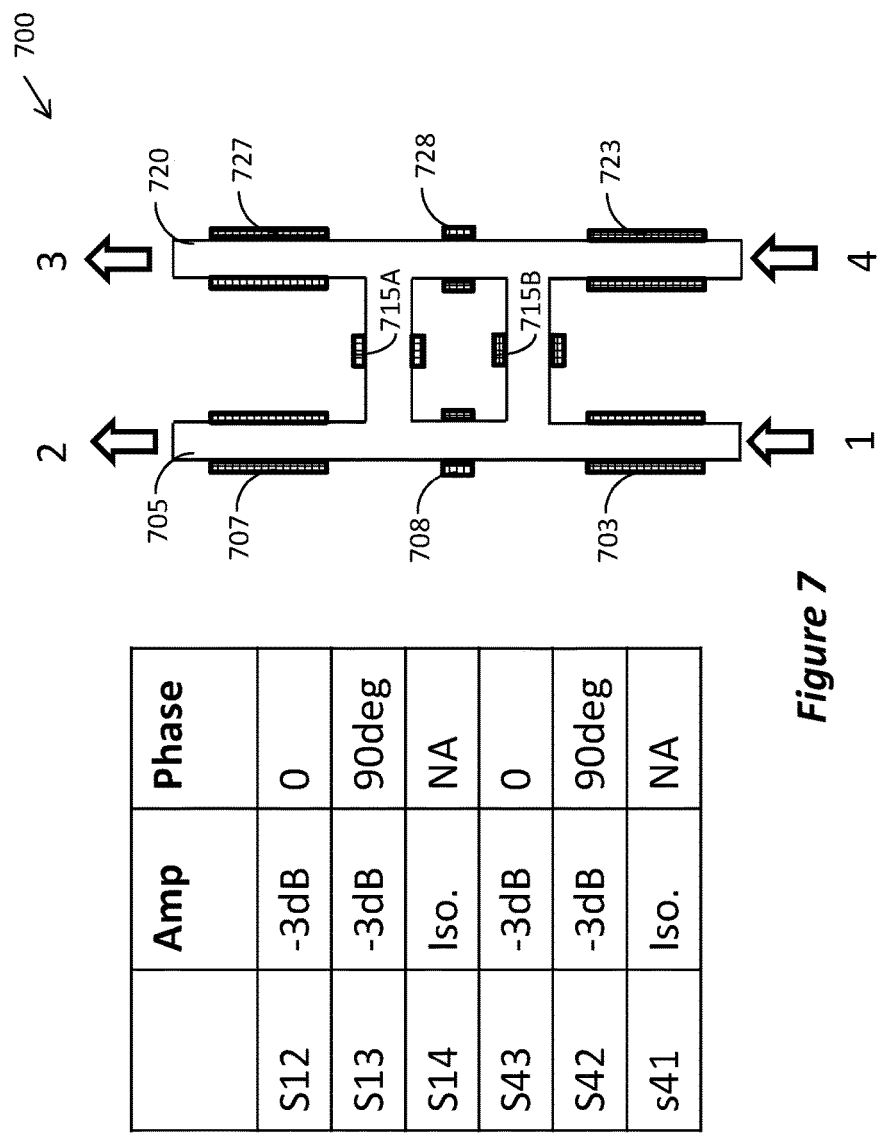
FIG. 7 illustrates a four-port hybrid splitter according to an embodiment of the invention.

FIG. 7 illustrates another embodiment of a four-ports hybrid coupler 700. Without any VDC's the signal input at port 1 splits into output to port 2 without phase change and into port 3 at 90 deg phase change. Similarly, a signal input to port 4 splits into output to port 3 without phase change and into port 2 at 90 deg phase change. This is captured by the table shown in FIG. 7. However, in the embodiment of FIG. 7 several optional placement for VDC's are shown, all or some of which may be implemented, depending on the desired control over the operation of the hybrid coupler 700.

For example, VDC 703 is provided under the line of input port 1. By applying voltage potential to the electrodes of VDC 703, the phase of the input signal can be controlled. Consequently, the phase at both output ports 2 and 3 would be varied together based on the phase change caused by the voltage potential at VDC 703. This means that the phase at output 2 can be different from the phase of the input signal at input port 1. On the other hand, the phase at output 2 can be changed independently by voltage potential at VDC 707. Consequently, the phase at output port 3 would remain 90° from the input at input port 1, but the phase at output port 2 would be different from zero, depending on the voltage potential applied to VDC 707. Additionally, a voltage potential can be applied to the electrodes of VDC 727 to vary the phase at output port 3 independent of the output at port 2. Thus, the output at port 2 can remain at the same phase as the input at port 1, but the output at port 3 can be modified from 90° with respect to the input at port 1. The same effect can be applied to the input of input port 4 by applying voltage potential to VDC's 723, 707 and 727. Moreover, normally an input signal at port 1 would be split at equal energies between output ports 2 and 3. However, by controlling the voltage potential at VDCs 708, 728, 715A and 715B, the amount of energy delivered to each output port can be changed, thus the amplitude of the output at each port can be controlled.

Figure 8:
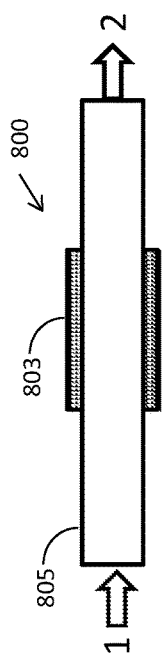
FIG. 8 illustrates a phase shifter element according to an embodiment of the invention.

Embodiments of the invention also provide two-port devices. For example, FIG. 8 illustrates a phase shifter element 800 according to an embodiment of the invention. Signal is input at port 1 and propagates on conductor line 805. Normally the output signal at port 2 would be at constant amplitude and at the same phase as the input signal. However, as shown by the table of FIG. 8, as voltage potential is applied to the electrodes of VDC 803, the phase of the output signal at port 2 can be changed with respect to the input at port 1.

Figure 9:
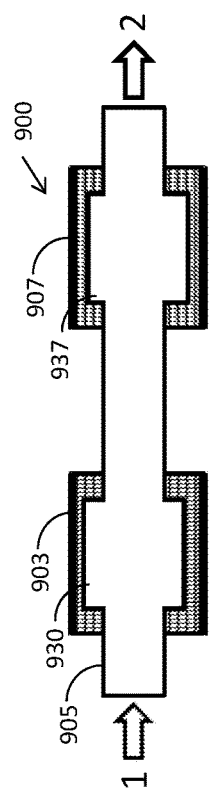
FIG. 9 illustrates an attenuator element according to an embodiment of the invention.

Another example of a two-port element is shown in FIG. 9. FIG. 9 illustrates an attenuator according to an embodiment of the invention. The input signal on port 1 traverses main line 905 and output at port 2 at the same phase, but under controlled amplitude. Specifically, two attenuators are provided on main line 905. The attenuators are made by conductive attenuation patch 930 and 937, provided over VDC 903 and 907. Depending on the voltage potential applied to the electrodes of VDCs 930 and 907, the amplitude of the signal output at port 2 can be controlled, i.e., attenuated.

Figure 10:
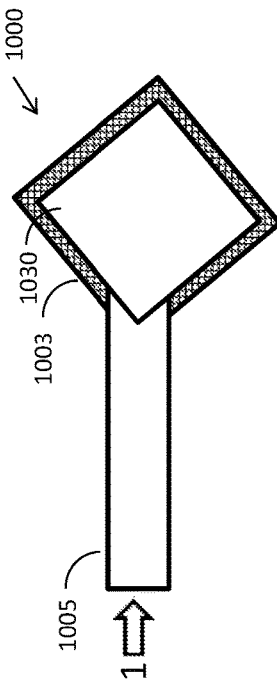
FIG. 10 illustrates a non-resonant capacitive load element according to an embodiment of the invention.

Embodiments of the invention also provide single-port devices. For example, FIG. 10 illustrates a single port load element 1000 according to an embodiment of the invention. In the example of FIG. 10 the load is in the form of a variable capacitor at a dead-end of a conductive line 1005. Specifically, a capacitor plate 1030 is formed at and is in electrical contact with a dead-end of main line 1005. The ground electrode of the VDC 1003 may form the complementary capacitor plate, or a complementary capacitor plate can be formed below the VDC 1003. The capacitance of this load can be varied by applying voltage potential to the electrodes of the VDC 1003.

Figure 11B:
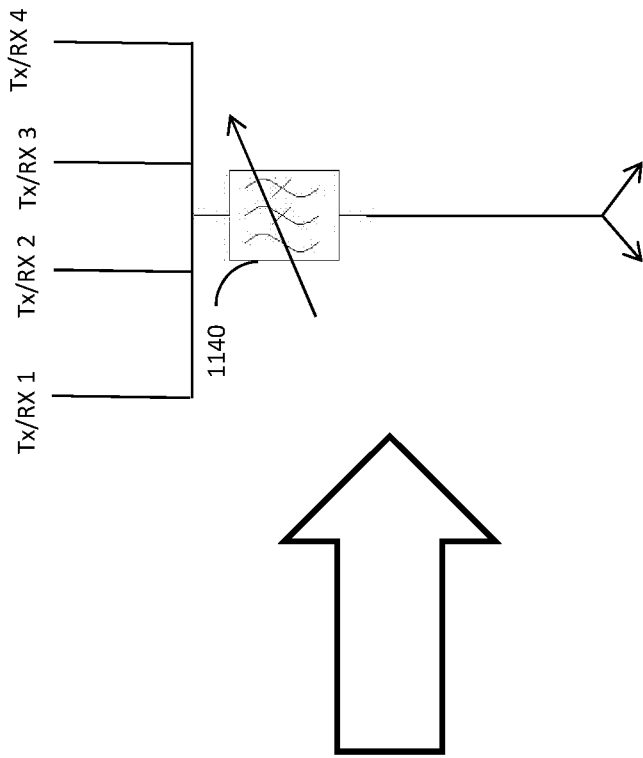
FIG. 11B illustrates a single variable filter according to an embodiment of the invention, replacing the arrangement of FIG. 11A.
Figure 11A:
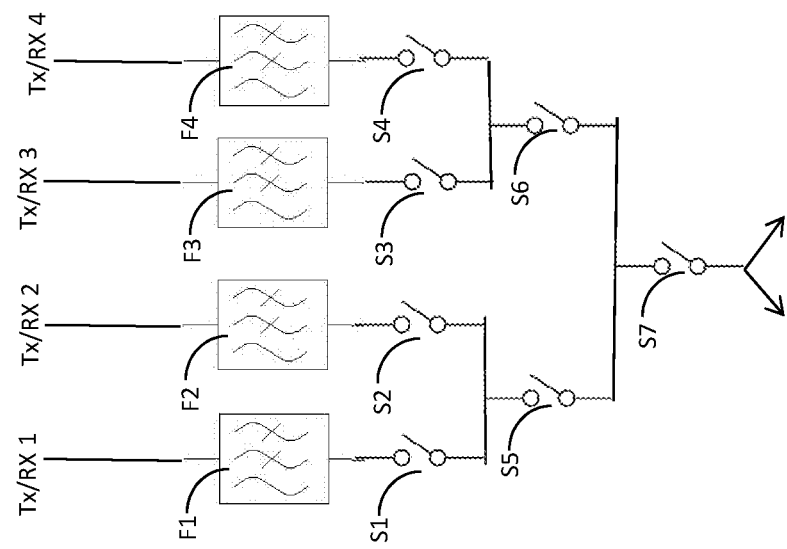

FIGS. 11A and 11B illustrate how elements according to disclosed embodiments can be used to simplify the construction of a switching array, as implemented in, e.g., cellphones. FIG. 11A illustrates the prior art switching arrangement. As illustrated, in this example both arrangements include four antennas, identified as Tx/Rx1-Tx/Rx4. Each antenna is designed to operate at a different frequency. In the prior art, illustrated in FIG. 7A, each antenna is connected to a dedicated fixed filter F1-F4, and each switch is connected to a dedicated switch S1-S4. Then, each two switches are connected to a single intermediate switch, i.e., switches S1 and S2 can be selected by intermediate switch S5 and switches S3 and S4 can be selected by intermediate switch S6. Switches S5 and S6 are connected to master switch S7. Thus, for example, if antenna Tx/Rx1 is to be selected, then switches S7, S5 and S1 are closed, while all other switches are switched to open position. Conversely, if antenna Tx/Rx3 is to be selected, then switches S7, S6 and S3 are closed, while all other switches are switched to open position. Thus, this arrangement requires four fixed filters and seven switches. Conversely, in the embodiment of FIG. 11B, a single variable filter is connected to all of the antennas Tx/Rx1-Tx/Rx4. Depending on which antenna is selected, a different voltage potential is applied to the electrodes of the VDC of variable filter 1140. The variable filter 1140 may be constructed according to the teachings provided herein using, e.g., the embodiment of FIG. 4.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention.

The present invention has been described in relation to particular examples, which are intended in all respects to be illustrative rather than restrictive. Those skilled in the art will appreciate that many different combinations of hardware, software, and firmware will be suitable for practicing the present invention. Moreover, other implementations of the invention will be apparent to those skilled in the art from consideration of the specification and practice of the invention disclosed herein. It is intended that the specification and examples be considered as exemplary only, with a true scope and spirit of the invention being indicated by the following claims.

The invention claimed is:

1. An electrical element having variable properties, comprising:
 a dielectric panel having electrically insulating properties;
 a bottom dielectric plate;
 a conductive line provided over the dielectric panel;
 a variable dielectric zone provided at a defined area below the conductive line, the variable dielectric zone comprising a variable dielectric constant material (VDC) sandwiched between the bottom dielectric plate and the dielectric panel and having electrodes coupled to a voltage source;
 wherein the electrical element comprises a variable filter wherein the conductive line comprises an input line of the variable filter, and wherein the variable filter comprises at least one output line provided on top of the dielectric panel, the output line having no ohmic contact to the input line, and further comprising a second variable dielectric zone provided in an area between the input line and the output line.

2. The variable filter of claim 1, further comprising a third variable dielectric zone provided under the output line.

3. An electrical element having variable properties, comprising:
 a dielectric panel having electrically insulating properties;
 a bottom dielectric plate;
 a conductive line provided over the dielectric panel;
 a variable dielectric zone provided at a defined area below the conductive line, the variable dielectric zone comprising a variable dielectric constant material (VDC) sandwiched between the bottom dielectric plate and the dielectric panel and having electrodes coupled to a voltage source;
 wherein the electrical element comprises a variable filter wherein the conductive line comprises an input line of the variable filter, and wherein the variable filter comprises plurality of output lines provided on top of the dielectric panel, each of the plurality of output lines having no ohmic contact to the input line or to another one of the plurality of output lines, and further comprising a plurality of variable dielectric zones each provided in an area between two of the plurality of output lines.

4. The variable filter of claim 3, further comprising a second plurality of variable dielectric zones, each provided under one of the plurality of output lines.

5. An electrical element having variable properties, comprising:
 a dielectric panel having electrically insulating properties;
 a bottom dielectric plate;
 a conductive line provided over the dielectric panel;
 a variable dielectric zone provided at a defined area below the conductive line, the variable dielectric zone comprising a variable dielectric constant material (VDC) sandwiched between the bottom dielectric plate and the dielectric panel and having electrodes coupled to a voltage source;
 wherein the electrical element comprises a variable attenuator, and furthur comprising an attenuation patch in ohmic contact with the conductive line, and wherein the defined area is under the attenuation patch.

6. An electrical element having variable properties, comprising:
 a dielectric panel having electrically insulating properties;
 a bottom dielectric plate;
 a conductive line provided over the dielectric panel;
 a variable dielectric zone provided at a defined area below the conductive line, the variable dielectric zone comprising a variable dielectric constant material (VDC) sandwiched between the bottom dielectric plate and the dielectric panel and having electrodes coupled to a voltage source;
 wherein the electrical element comprises a variable load, and further comprising capacitor plate in ohmic contact with the conductive line, and wherein the defined area is under the capacitor plate.

7. A splitter, comprising:
 a dielectric panel having electrically insulating properties;
 a bottom dielectric plate;

a main line provided over the dielectric panel and having a first input port and a first output port;

a coupled line provided over the dielectric panel and having a second output port, the coupled line being spaced apart from, and positioned in a parallel orientation to the main line;

a variable dielectric zone provided at a defined area between the main line and the coupled line, the variable dielectric zone comprising a variable dielectric constant material (VDC) sandwiched between the bottom dielectric plate and the dielectric panel and having electrodes coupled to a voltage source.

8. The splitter of claim 7, wherein the coupled line further comprises a second input port.

9. The splitter of claim 8, further comprising a second variable dielectric zone provided in a defined area under one of the main line and the coupled line.

10. The splitter of claim 8, further comprising a second variable dielectric zone provided in a defined area under the main line and a third variable dielectric zone provided in a defined area under the coupled line.

11. The splitter of claim 8, further comprising a bridge line having ohmic contact with the main line at one end and with the coupled line at another end.

12. The splitter of claim 11, further comprising a fourth variable dielectric zone provided in a defined area under the bridge line.

13. A variable filter comprising:
a dielectric panel having electrically insulating properties;
a bottom dielectric plate;
an input line provided over the dielectric panel;
at least one coupled line provided over the dielectric panel and being spaced apart from, and positioned in a parallel orientation to the input line, the coupled line having an output tap;

a variable dielectric zone provided at a defined area between the input line and the coupled line, the variable dielectric zone comprising a variable dielectric constant material (VDC) sandwiched between the bottom dielectric plate and the dielectric panel and having electrodes coupled to a voltage source.

14. The variable filter of claim 13, further comprising a second variable dielectric zone provided at a defined area under the input line.

15. The variable filter of claim 13, further comprising a second variable dielectric zone provided at a defined area under the coupled line.

16. A variable filter comprising:
a dielectric panel having electrically insulating properties;
a bottom dielectric plate;
an input line provided over the dielectric panel;
a plurality of coupled line provided over the dielectric panel and each being spaced apart from, and positioned in a parallel orientation to the input line, at least one of the plurality of coupled lines having an output tap;

a plurality of variable dielectric zones, each provided at a defined area between two of the plurality of coupled lines, the variable dielectric zone comprising a variable dielectric constant material (VDC) sandwiched between the bottom dielectric plate and the dielectric panel and having electrodes coupled to a voltage source.

17. The variable filter of claim 16, further comprising a second plurality of variable dielectric zones, each provided at a defined area under one of the coupled line.

* * * * *